United States Patent Office 3,141,161
Patented July 14, 1964

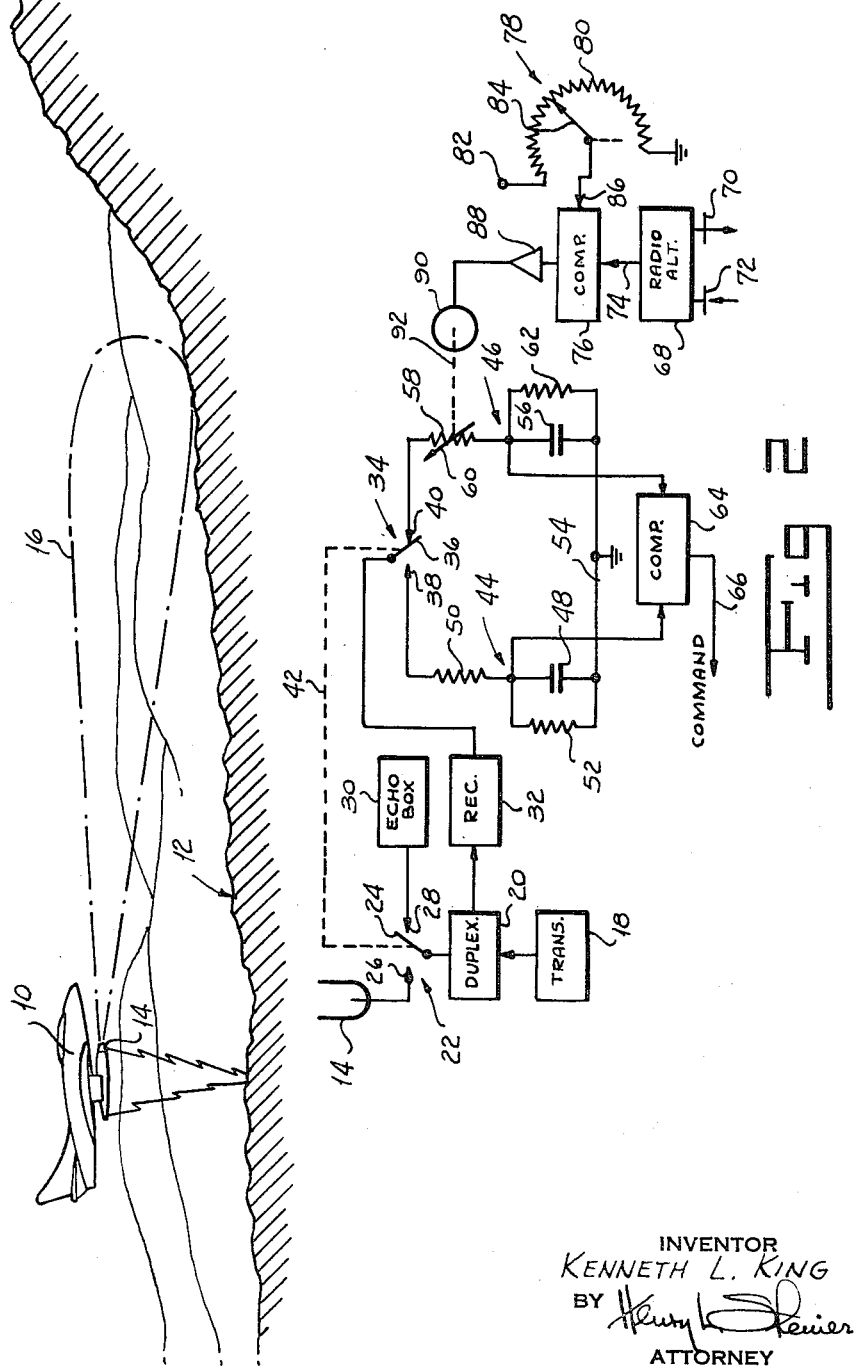

3,141,161
CALIBRATED RADAR ALTITUDE CONTROL WHICH COMPENSATES FOR CHANGES IN GROUND REFLECTIVITY
Kenneth L. King, Eastchester, N.Y., assignor to United Aircraft Corporation, East Hartford, Conn., a corporation of Delaware
Filed May 11, 1959, Ser. No. 812,374
5 Claims. (Cl. 343—7)

My invention relates to an improved radar altitude control and more particularly to a radar altitude control which is automatically calibrated to compensate for variations in the condition of terrain over which the controlled aircraft passes.

The copending application of William W. Fenn, Serial No. 757,484, filed August 27, 1958, now Patent No. 3,071,766, discloses a Radar Altitude Control which automatically produces a command signal for directing the aircraft to fly at a desired altitude set into the control. In use, the system is set up for a predetermined average condition of terrain and transmitted power is compared with received power to afford an indication of altitude which causes the control to produce the command signal. While the system shown in the copending application operates satisfactorily over terrain approximating the predetermined average condition, I have discovered that the deviation of terrain condition and ground reflectivity from the average condition is so great that the system disclosed in the copending application does not operate satisfactorily in many instances. Where the aircraft carrying the control is passing over water or terrain having a higher than average reflectivity, the received power is greater than that which would be produced by average terrain at the same altitude and the aircraft is caused to fly at a higher altitude than the desired altitude. On the other hand, where the terrain over which the aircraft is passing has a lower than average reflectivity, the craft is directed to fly at an altitude which is below the desired altitude set into the system.

I have invented an improved radar altitude control which is continuously calibrated to avoid the deviation from the desired altitude set into the device owing to a variation in the condition of terrain. My control is not affected by variations in the reflectivity of the terrain over which the controlled aircraft is passing.

One object of my invention is to provide an improved radar altitude control which is continuously calibrated to avoid deviations from the desired altitude set into the control.

Another object of my invention is to provide an improved radar altitude control which is continuously compensated for the effect of variation in terrain conditions and ground reflectivity.

Other and further objects of my invention will appear from the following description.

In general my invention contemplates the provision of an automatically calibrated radar altitude control in which transmitted power is compared with received power to produce an electrical signal representing the difference between the actual altitude of the controlled aircraft and the desired altitude set into the control. I employ a radio altimeter which produces a signal indicating altitude independently of terrain conditions for producing a control signal which actuates the desired altitude setting element of the power comparing system to cause a signal produced by received power storage system to correspond to the actual altitude irrespective of variations in the condition of terrain.

In the accompanying drawings which form part of the instant specification and which are to be read in conjunction therewith and in which like reference numerals are used to indicate like parts in the various views:

FIGURE 1 is an elevation illustrating an aircraft employing my automatically calibrated radar altitude control passing over terrain.

FIGURE 2 is a schematic view of my automatically calibrated radar altitude control.

Referring now more particularly to the drawings, I have shown an aircraft 10 provided with my automatically calibrated radar altitude control passing over terrain, indicated generally by the reference character 12. A radar antenna 14 carried by the craft 10 is adapted to produce a radiation pattern enclosed in the envelope 16. As is explained more fully in the copending application referred to hereinabove, I mount the antenna 14 on the aircraft 10 at a fixed depression angle with respect to a fixed longitudinal reference line in the aircraft to permit a measurement of received power to afford a measure of the altitude of the aircraft.

My system includes a radar transmitter 18 which feeds duplexer 20 which may be of any suitable type known to the art. I connect the output channel of the duplexer 20 to the input terminal of a wave guide switch, indicated generally by the reference character 22. Switch 22 may be any suitable type of wave guide switch known to the art such, for example, as that shown in Patent No. 2,809,354 issued October 8, 1957, to P. J. Allen for an Electronic Microwave Switch. For the purposes of clarity in exposition, I have shown switch 22 schematically as including a contact arm 24 adapted to be actuated alternately to engage a contact 26 and a contact 28. I connect contact 26 to the antenna 14 and connect contact 28 to an echo box 30 of any suitable type known to the art. From the structure just described it will be apparent that with switch 22 in a condition at which arm 24 engages contact 26, duplexer 20 passes transmitted pulses to the antenna 14. In the other condition of the switch 22, arm 24 engages contact 28 to cause the duplexer 20 to pass transmitted pulses to the echo box 30.

I connect a radar receiver 32 of any suitable type known to the art to receive pulses from the duplexer 20. Receiver 32 passes pulses to a second wave guide switch, indicated generally by the reference character 34, similar to the switch 22. I have indicated switch 34 schematically for purposes of clarity as having a contact arm 36 adapted to be actuated alternately to engage a contact 38 and a contact 40. In my system I operate the switches 22 and 34 in unison in a manner known to the art to cause arms 24 and 36 to engage contacts 26 and 38 in one condition of the switches and to engage contacts 28 and 40 in the other condition of the switches. For simplicity I have indicated this operation as a mechanical linkage 42 which gangs the arms 24 and 36.

I connect the respective contacts 38 and 40 to integrating networks, indicated generally by the reference characters 44 and 46. The network 44 includes a capacitor 48 connected between the common terminal of a pair of voltage dividing resistors 50 and 52 and a conductor 54 connected to ground. Network 46 includes a capacitor 56 connected between the common terminal of a variable resistor 58 having an arm 60 and a resistor 62, making up a voltage divider, and the conductor 54. I connect the terminals of leakage resistors 52 and 56 remote from resistors 50 and 58 to ground conductor 54.

From the system thus far described it will be apparent that with switch arms 24 and 36 in positions at which they engage contacts 26 and 38 transmitted pulses pass from duplexer 20 to the antenna 14 from which they are radiated to ground. Pulses reflected from ground return through the antenna 14, through duplexer 20, through receiver 32, and through switch arm 36 and contact 38 to the network 44. The result of this operation is that network 44 at the common terminal of resistors 50 and 52 produces a potential indicating the received power. With switch arms 24 and 36 in positions at which they engage contacts 28 and 40, transmitted pulses pass through arm 24 and contact 28 to the echo box 30 from which they return through the duplexer 20 and the receiver 32 to the network 46 through arm 36 and contact 40. As a result of this operation, network 46 produces, at the common terminal of resistors 58 and 62, a potential which is a measure of transmitted power. As is explained more fully in the copending application referred to hereinabove, with the arm 60 set to a value corresponding to a desired altitude, the difference in the signals appearing at the common terminal of resistors 50 and 52 and at the common terminal of resistors 58 and 62 represents the difference between the actual altitude and the desired altitude.

I connect a comparator 64 of any suitable type known to the art between the common terminal of resistors 50 and 52 and the common terminal of resistors 58 and 62 to provide an output signal on a channel 66. This output signal may be employed as a command signal to cause the aircraft to fly to the desired altitude.

The system thus far described is substantially the system shown in the copending application referred to hereinabove. As has been pointed out, while this system operates satisfactory over terrain approximating the average terrain condition for which the system is set up, it does not operate satisfactorily where, as in many instances, there is a considerable variation between actual terrain condition and ground reflectivity and the condition for which the system has been set up.

In my improved radar altitude control system, the aircraft 10 carries a radar altimeter 68 of any suitable type known to the art having a transmitting antenna 70 and a receiving antenna 72. As is known in the art, the altimeter 68 continuously produces an electrical signal on its output channel 74. This signal indicates the altitude of the aircraft independently of variations in reflectivity of the terrain.

I connect the channel 74 to one input terminal of a comparator 76 of any suitable type known to the art. I provide my improved system with a potentiometer or the like, indicated generally by the reference character 78, for producing an electrical signal representing the altitude at which it is desired to have the aircraft travel. Potentiometer 78 includes a winding 80 connected between the terminal 82 of a suitable source of electrical potential and ground. A brush 84 is adapted to be moved along the winding 80 to a position to pick off a voltage proportional to the desired altitude. A conductor 86 connects the brush 84 to the other input terminal of comparator 76 to cause the comparator to produce an output signal representing the difference between the actual altitude as measured by the altimeter 68 and the desired altitude indicated by the position of brush 84.

I connect the output of the comparator 76 to an amplifier 88 which amplifies this difference signal and feeds the amplified signal to a servomotor 90 which drives the arm 60 of resistor 58 through a linkage 92 providing a suitable gear reduction. From the structure just described it will be seen that the arm 60 is positioned in accordance with the difference between the actual altitude and the desired altitude.

In operation of my improved radar altimeter, the circuit 44 normally produces a potential, at the mid-point of resistors 50 and 52, which is a measure of received power and thus is a measure of the actual altitude of the aircraft. The circuit 46 normally produces a potential, at the mid-point of resistors 58 and 62, which is a measure of the transmitted power. By moving the arm 60, the potential provided by the circuit 46 can be made to correspond to the amount of power which should be received at a given altitude when flying over average terrain. As will be explained hereinafter, I set the arm 60 in such a way that the signal produced by the circuit 46 always is a measure of true altitude even though the received power may be affected by variations in the reflectivity of the terrain. When the aircraft is actually flying over terrain having the average reflectivity for which the system is set, no potential difference exists between the common terminal of resistors 58 and 62 and the common terminal of resistors 50 and 52 with the result that the comparator 64 produces no output signal. If, however, the aircraft is above or below the desired altitude indicated by the position of arm 60 and the craft is flying over average terrain, the comparator 64 produces an output signal of a phase and magnitude to cause the aircraft to be directed to the desired altitude.

As has been explained hereinabove, if, for example, the aircraft is flying at the desired altitude but is passing over terrain which is a poorer than average reflector, then the received power causes the potential at the mid-point of resistors 50 and 52 to be less than the potential which would exist at this point if the aircraft were flying over average terrain. It would, therefore, seem, as is the case with the system shown in the copending application, that the aircraft would be caused to descend by the output signal from the comparator. My improved control system avoids this result. It will be remembered that the altimeter 68 always produces an output signal representing the actual altitude of the aircraft irrespective of variations in ground reflectivity. When, owing to poor ground reflectivity, the system tends to produce a command signal directing the aircraft to descend, the comparator 76 produces an output signal which, through the motor 90 and linkage 92, drives the arm 60 in a direction corresponding to the direction in which the arm is driven when the aircraft is above the desired altitude. This action compensates for the change in ground reflectivity from the average condition for which the system is set. Similarly, when the ground reflectivity is appreciably better than the average to cause the system to tend to produce a signal directing the aircraft to rise above the desired altitude, motor 90 is caused to drive arm 60 in a direction corresponding to the condition at which the aircraft is above the desired altitude to compensate the system for the change in ground reflectivity.

From the foregoing description, it will be apparent that my system functions in a manner which is readily distinguished from the manner in which systems of the prior art operate. As is known in the art, a radio altimeter measures range or altitude by measuring the time delay between the time of transmission of a pulse and the time at which the pulse is received. My system, on the other hand, is basically amplitude responsive. Thus, while a time delay system responds to any received pulse irrespective of its magnitude, my system lends significance to the area within the radiation pattern from which the received energy comes.

My positioning of the antenna 14 at a fixed depression angle causes range to depend on the angle of attack relative to the surface. If a time delay system were arranged in this manner, there would result some anticipation over smoothly varying surfaces having no abrupt changes. This attitude sensitivity is lost, however, if the system responds to radiation normal to the surface. In other words, a narrow beam directed at a small fixed depression angle to the horizontal produces large attitude sensitivity, while a system which is responsive to vertical radiation produces no attitude sensitivity. For this reason, in order to produce a system which is attitude sensitive, the radiation beam must be cut off sharply so that the system does not respond to depression angles which are larger than a set maximum. As now known in the art, if a system is arranged to produce a sharp cut off of the beam on one side, it is inherent in the antenna that it will cut off changes as sharply on the other side. It is necessary to use a large antenna producing a narrow beam to achieve sharp cut off and directivity. If this is done and the beam is directed at such an angle as to provide some measure of the altitude of the craft over a point directly below the craft, then the narrow beam will not look ahead far enough to permit a sharply rising obstacle to be avoided. On the other hand, a narrow beam of this nature cannot be orientated to look too far ahead, as no reliable indication of actual altitude above the terrain can then be produced. For these reasons, a time delay system having a very narrow beam will not produce a satisfactory system for controlling altitude while at the same time anticipating changes in terrain and obstacles in the path of the craft.

My system which is responsive to the amplitude of the received radiation avoids the problems outlined above. My system not only gives an indication of range or altitude but also of the slope or normality of the surface. It produces a high degree of damping and anticipating. My system can distinguish fifty feet of altitude of the terrain directly below the craft and one thousand feet of range ahead of the craft. If the craft is below fifty feet of altitude, a signal causing the craft to rise is produced. Moreover, when the craft is flying at a desired altitude of fifty feet, for example, as it approaches to within one thousand feet of an obstacle ahead of the craft, then a signal is produced causing the aircraft to rise, thus anticipating the obstacle or terrain change. In summary, my system functions to anticipate obstacles even is some energy is received from normal to the surface over which the craft is flying. The radiation pattern produced by the antenna attenuates so that energy received from in front of the craft is of greater apparent significance than is energy received from normal to the surface. In effect, my system averages the energy received from the whole region both below and out in front of the craft.

From the foregoing, it will be appreciated that a system which measures time can only look through a small peephole while my system, which responds to amplitude, provides a whole field of view. While amplitude responsive systems permit anticipation of obstacles and changes in terrain, the result produced thereby is affected by variations in reflectivity of the terrain. This is not true of a radio altimeter. My radio altimeter system compensates the amplitude responsive system for changes in the character of the terrain over which the craft is flying.

It is to be noted that my improved system has the same advantages as the system described in the copending application of anticipating changes in the altitude of terrain. At the same time my system has the further advantage of being capable of operating over a larger range of terrain conditions.

It will be seen that I have accomplished the objects of my invention. I have provided a radar altitude control system which operates over a large range of ground reflectivity. My system is substantially independent of changes in the condition of terrain and ground reflectivity.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A radar altitude control system for producing a command signal for directing an aircraft to a desired altitude including in combination an antenna, means mounting said antenna on said aircraft, a radar transmitter, means coupling said transmitter to said antenna, means for producing a first electrical signal having an amplitude varying as a function of transmitted power, a radar receiver, means including said receiver for producing a second electrical signal having an amplitude vary as a function of received power, means for comparing the amplitudes of said first and second signals to produce said command signal, means for producing a third signal proportional to the actual altitude over the ground of said aircraft independent of variations in ground reflectivity and means responsive to said third signal for varying the amplitude of one of said first and second signals to compensate for variations in ground reflectivity.

2. A radar altitude control system for an aircraft including in combination an antenna, means mounting the antenna on the aircraft at a constant forward depression angle which is appreciably greater than zero degrees and appreciably less than ninety degrees, means for transmitting radar pulses from the antenna, means responsive to power received by the antenna for generating an altitude control signal, a radio altimeter for producing a signal corresponding to the actual altitude over the ground of the aircraft independent of ground reflectivity, and means responsive to said altimeter signal for compensating said power responsive means for changes in ground reflectivity.

3. A radar altitude control system for producing a command signal for directing an aircraft to a desired altitude including in combination an antenna, means mounting the antenna on the aircraft, a radar transmitter, a radar receiver, an echo box, first means for alternately coupling said transmitter to said antenna and to said echo box, first energy storage means, second energy storage means, second means for alternately coupling said receiver to said first and to said second energy-storing means, means for actuating said first and second coupling means in unison alternately to first conditions at which said transmitter applies a transmitter pulse to said echo box and at which said echo box transfers energy stored from said transmitter pulse through said receiver to the first energy-storing means and to second conditions at which said transmitter feeds a pulse to said antenna and at which reflected pulse is fed through said receiver to said second energy-storing means, means for comparing the energies stored by said energy-storing means, a radio altimeter for producing an altitude signal independent of ground reflectivity, and means responsive to said altitude signal for compensating said second energy-storing means for changes in ground reflectivity.

4. A radar altitude control system for producing a command signal for directing an aircraft to fly at a desired altitude including in combination an antenna, means mounting said antenna on the aircraft, means for transmitting radar pulses from said antenna, means responsive to power received by the antenna for generating said command signal, a radio altimeter for producing an output signal corresponding to the actual altitude over the ground of the aircraft independent of ground reflectivity, means for producing a signal corresponding to said desired altitude, means for comparing the actual altitude and the desired altitude signals to produce a control signal and means responsive to said control signal for compensating said power responsive means for changes in ground reflectivity.

5. A radar altitude control system for producing a command signal for directing the aircraft to a desired altitude including in combination an antenna, means mounting the antenna on the aircraft, a radar transmitter, a radar receiver, an echo box, a first energy storing network for producing an output signal proportional to the energy stored, a second energy storing network for producing an output signal proportional to the energy stored, said second network comprising a variable impedance adapted to be actuated to vary the output of the second network, first means for alternately coupling said transmitter to said antenna and to said echo box, second means for alternately coupling said receiver to said first network and to said second network, means for actuating said first and second coupling means in unison alternately to first conditions at which said transmitter applies a transmitter pulse to said echo box and at which said echo box transfers energy stored from said transmitter pulse through said receiver to the first energy storing network and to second conditions at which said transmitter feeds a pulse to said antenna and at which a reflected pulse is fed through said receiver to said second energy storing means, a radio altimeter for producing a signal proportional to the actual altitude of said aircraft independent of ground reflectivity, means for producing a signal proportional to the desired altitude, means for comparing the actual altitude and the desired altitude signals to produce a control signal, means responsive to said control signal for varying said impedance to compensate the system for variations in ground reflectivity, and means for comparing said first and second network output signals to produce said command signal.

References Cited in the file of this patent

UNITED STATES PATENTS

| | | |
|---|---|---|
| 2,562,186 | Hallman | July 31, 1951 |
| 2,740,294 | Sanders | Apr. 3, 1956 |
| 2,930,035 | Altekruse | Mar. 22, 1960 |
| 2,965,894 | Sweeney | Dec. 20, 1960 |
| 3,072,900 | Beck | Jan. 8, 1963 |